(12) United States Patent
Petersen et al.

(10) Patent No.: US 12,038,371 B2
(45) Date of Patent: Jul. 16, 2024

(54) PARTICLE ANALYZERS HAVING SCINTILLATION COUNTERS, AND METHODS OF USE THEREOF

(71) Applicant: Becton, Dickinson and Company, Franklin Lakes, NJ (US)

(72) Inventors: Timothy Petersen, Seattle, WA (US); Geoffrey Osborne, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 4 days.

(21) Appl. No.: 17/708,381

(22) Filed: Mar. 30, 2022

(65) Prior Publication Data

US 2022/0364979 A1    Nov. 17, 2022

Related U.S. Application Data

(60) Provisional application No. 63/189,489, filed on May 17, 2021.

(51) Int. Cl.
| | |
|---|---|
| *G01N 15/149* | (2024.01) |
| *G01N 15/1434* | (2024.01) |
| *G01T 1/20* | (2006.01) |
| *G01T 1/202* | (2006.01) |
| *G01N 15/01* | (2024.01) |
| *G01N 15/10* | (2006.01) |

(52) U.S. Cl.
CPC ....... *G01N 15/1434* (2013.01); *G01T 1/2018* (2013.01); *G01T 1/202* (2013.01); *G01N 15/01* (2024.01); *G01N 2015/1006* (2013.01); *G01N 15/149* (2024.01)

(58) Field of Classification Search
CPC ....... G01N 15/1434; G01N 2015/0065; G01N 2015/1006; G01N 2015/149; G01N 15/0205; G01N 2015/1493; G01N 15/1459; G01T 1/2018; G01T 1/202; G01T 1/003

See application file for complete search history.

(56) References Cited

U.S. PATENT DOCUMENTS

| | | |
|---|---|---|
| 3,898,463 A | 8/1975 | Noakes et al. |
| 3,912,929 A | 10/1975 | Cobb et al. |
| 4,704,531 A | 11/1987 | Berthold et al. |

(Continued)

FOREIGN PATENT DOCUMENTS

| | | |
|---|---|---|
| WO | WO2011018764 A2 | 6/2011 |
| WO | WO2017189783 A1 | 11/2017 |

*Primary Examiner* — David P Porta
*Assistant Examiner* — Mamadou Faye
(74) *Attorney, Agent, or Firm* — Peter W. Schroen; Bret E. Field; BOZICEVIC, FIELD & FRANCIS LLP

(57) ABSTRACT

Particle analyzers having scintillation counters are provided. Particle analyzers of interest include a flow cell for transporting particles in a flow stream, a light source for irradiating a particle in the flow stream at an interrogation point, a particle-modulated light detector for detecting light from the interrogation point, and a scintillation counter for assessing particle radioactivity. In embodiments, the scintillation counter is positioned within the flow cell and configured generate particle radioactivity data that may be associated with a given particle in a plurality of particles. Methods and non-transitory computer readable storage media for practicing the invention are also provided.

20 Claims, 8 Drawing Sheets

(56) References Cited

U.S. PATENT DOCUMENTS

| | | | |
|---|---|---|---|
| 6,303,936 B1* | 10/2001 | DeVol | C09K 11/06 |
| | | | 250/364 |
| 7,381,565 B2 | 6/2008 | Kurabayashi et al. | |
| 8,227,257 B2 | 7/2012 | Ward et al. | |
| 10,175,219 B2 | 1/2019 | Pratx et al. | |
| 2011/0053289 A1* | 3/2011 | Lowe | B01L 3/502761 |
| | | | 436/501 |
| 2017/0059722 A1* | 3/2017 | Stein | G01T 1/202 |
| 2017/0248508 A1* | 8/2017 | Ward | B01L 3/502753 |
| 2019/0041314 A1 | 2/2019 | Rowlen et al. | |
| 2020/0376022 A1* | 12/2020 | Domenyuk | C12Q 1/6883 |

* cited by examiner

PRIOR ART

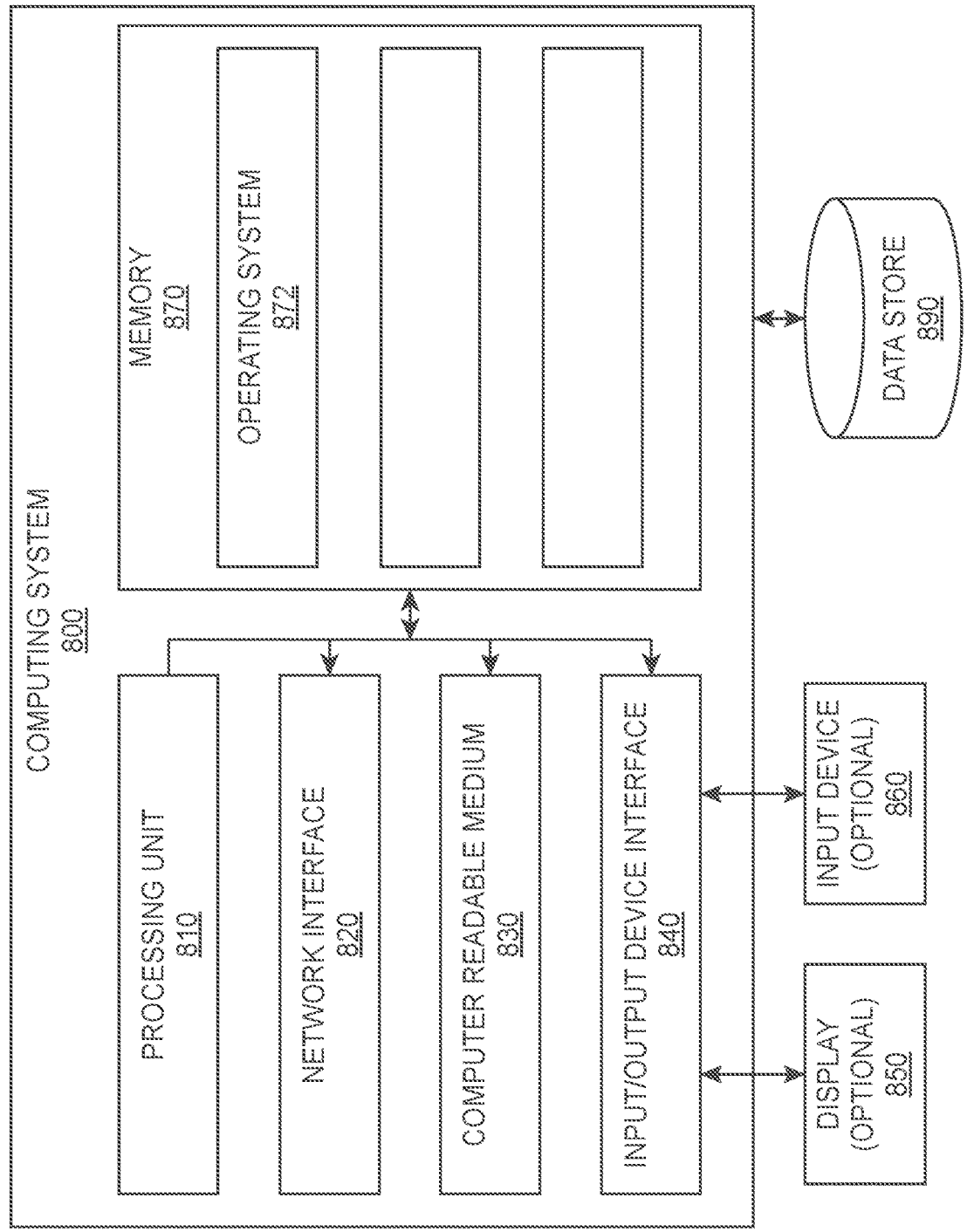

PARTICLE ANALYZERS HAVING SCINTILLATION COUNTERS, AND METHODS OF USE THEREOF

CROSS-REFERENCE TO RELATED APPLICATIONS

Pursuant to 35 U.S.C. § 119 (e), this application claims priority to the filing date of United States Provisional Patent Application Ser. No. 63/189,489 filed May 17, 2021; the disclosure of which application is incorporated herein by reference in their entirety.

INTRODUCTION

The characterization of analytes in biological fluids has become an important part of biological research, medical diagnoses and assessments of overall health and wellness of a patient. Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

Isolation of biological particles has been achieved by adding a sorting or collection capability to flow cytometers. Particles in a segregated stream, detected as having one or more desired characteristics, are individually isolated from the sample stream by mechanical or electrical removal. A common flow sorting technique utilizes drop sorting in which a fluid stream containing linearly segregated particles is broken into drops. The drops containing particles of interest are electrically charged and deflected into a collection tube by passage through an electric field. Typically, the linearly segregated particles in the stream are characterized as they pass through an observation point situated just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left un-charged.

The parameters measured using a flow cytometer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

SUMMARY

Particle analyzers having scintillation counters are provided. Particle analyzers of interest include a flow cell for transporting particles in a flow stream, a light source for irradiating a particle in the flow stream at an interrogation point, a particle-modulated light detector for detecting light from the interrogation point, and a scintillation counter for assessing particle radioactivity. In embodiments, the scintillation counter is positioned within the flow cell and configured generate particle radioactivity data that may be associated with a given particle in a plurality of particles. Methods and non-transitory computer readable storage media for practicing the invention are also provided.

Conventionally, the specificity and the degree to which target cells are labelled by a radioactive biomolecule can be ascertained only by imaging or bulk measurements. In prior solutions, for example, an ensemble (i.e., group) of cells is passed through tubing near a scintillation counter to measure the relative radioactivity of the sample. Such techniques only permit bulk radioactivity measurements of the sample as a whole. Because conventional approaches for measuring particle radioactivity generally require assessing the radioactivity of a whole sample and do not ascertain the radioactivity of individual particles, the inventors have realized that systems and methods for assessing particle radioactivity (e.g., radioactivity of an individual cell) are consequently required. Embodiments of the invention satisfy this and other needs.

Aspects of the invention include particle analyzers (e.g., flow cytometers) having a scintillation counter. Scintillation counters of interest include a scintillator (e.g., crystal) and a scintillated light detector (e.g., a photomultiplier tube). In certain cases, the scintillator is optically opaque, such as where the scintillator includes an opaque coating. In embodiments, particle analyzers also include a flow cell for transporting particles in a flow stream, a light source for irradiating a particle in the flow stream at an interrogation point, and a particle-modulated light detector (e.g., forward-scattered light detector, fluorescent light detector, side-scattered light detector) for detecting light from the interrogation point. The scintillation counter may, in some instances, be positioned within the flow cell and separated from the interrogation point by any suitable distance. In certain cases, the scintillation counter is positioned within the flow cell at a downstream location relative to the interrogation point. In other cases, the scintillation counter is positioned within the flow cell at an upstream location relative to the interrogation point. The flow cell may, in some embodiments, further include a particle injection conduit for injecting particles into the flow cell at a proximal end. Particle injection conduits of interest may include, but are not limited to, an elongated tubing, such as a coiled elongated tubing. Where particle analyzers include a particle injection conduit, a scintillation counter may be attached to the particle injection conduit to assess the radioactivity of the particles being transported therethrough. The flow cell may, in some embodiments, further include a particle ejection conduit for ejecting particles from the flow cell at a distal end. Particle ejection conduits of interest may include, but are not limited to, an elongated tubing, such as a coiled elongated tubing. Where particle analyzers include a particle ejection conduit, a scintillation counter may be attached to the particle ejection conduit to assess the radioactivity of the particles being transported therethrough.

Aspects of the invention further include methods for analyzing a sample (e.g., a radiolabeled biological sample). Methods of interest include introducing the sample into a particle analyzer (e.g., flow cytometer) having a flow cell for transporting particles in a flow stream, a light source for irradiating a particle in the flow stream at an interrogation point, a particle-modulated light detector (e.g., forward-scattered light detector, fluorescent light detector, side-scattered light detector) for detecting light from the interrogation point, and a scintillation counter for assessing particle radioactivity. In some cases, methods further include preparing a radiolabeled sample for introduction into the particle analyzer. In certain instances, analyzing the sample includes obtaining particle-modulated light intensity data and particle radioactivity data from each individual particle in the sample. In other embodiments, analyzing the sample comprises obtaining particle-modulated light intensity data and aggregate (i.e., bulk) particle radioactivity data from a plurality of particles. Methods of interest may further include associating the obtained particle-modulated light intensity data and particle radioactivity data with a given particle. For example, methods may include associating the received particle-modulated light intensity data and particle radioactivity data with the given particle based on the amount of elapsed time between the time point at which particle-modulated light is detected and the time point at which the radioactivity of the particle is assessed. Non-transitory computer readable storage media having instructions stored thereon for performing the instant method are also provided.

Methods for assembling a particle analyzer (e.g., flow cytometer) are additionally provided. In embodiments, such methods include positioning a scintillation counter into a particle analyzer. In further embodiments, methods are provided for positioning a particle injection conduit and/or a particle ejection conduit into a particle analyzer. In some cases, methods also include attaching a scintillation counter to one or both of the particle injection conduit and the particle ejection conduit.

BRIEF DESCRIPTION OF THE FIGURES

The invention may be best understood from the following detailed description when read in conjunction with the accompanying drawings. Included in the drawings are the following figures:

FIG. 8 depicts a block diagram of a computing system according to certain embodiments.

DETAILED DESCRIPTION

Figure 1:
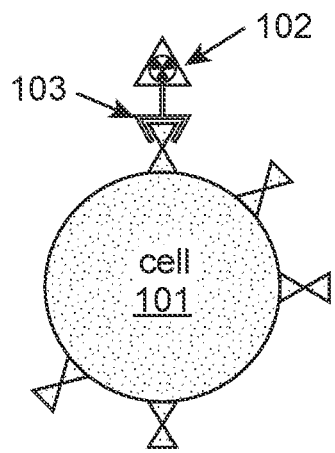
FIG. 1 depicts a radiolabeled cell.

Particle analyzers having scintillation counters are provided. Particle analyzers of interest include a flow cell for transporting particles in a flow stream, a light source for irradiating a particle in the flow stream at an interrogation point, a particle-modulated light detector for detecting light from the interrogation point, and a scintillation counter for assessing particle radioactivity. In embodiments, the scintillation counter is positioned within the flow cell and configured generate particle radioactivity data that may be associated with a given particle in a plurality of particles. Methods and non-transitory computer readable storage media for practicing the invention are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Particle Analyzers Having Scintillation Counters

As discussed above, aspects of the invention include particle analyzers having a scintillation counter for assessing particle radioactivity. As discussed herein, a "particle analyzer" is an analytical tool that enables the characterization of particles on the basis of certain (e.g., optical) parameters. The subject particle analyzers include, but are not limited to, flow cytometers. In a flow cytometer, particles in a fluid suspension are passed by an interrogation point in which the particles are exposed to an excitation light, typically from one or more lasers, and the light scattering and fluorescence properties of the particles are measured. Other particle analyzers that may be adapted for use in the present invention include, for example, mass cytometers.

Figure 2:
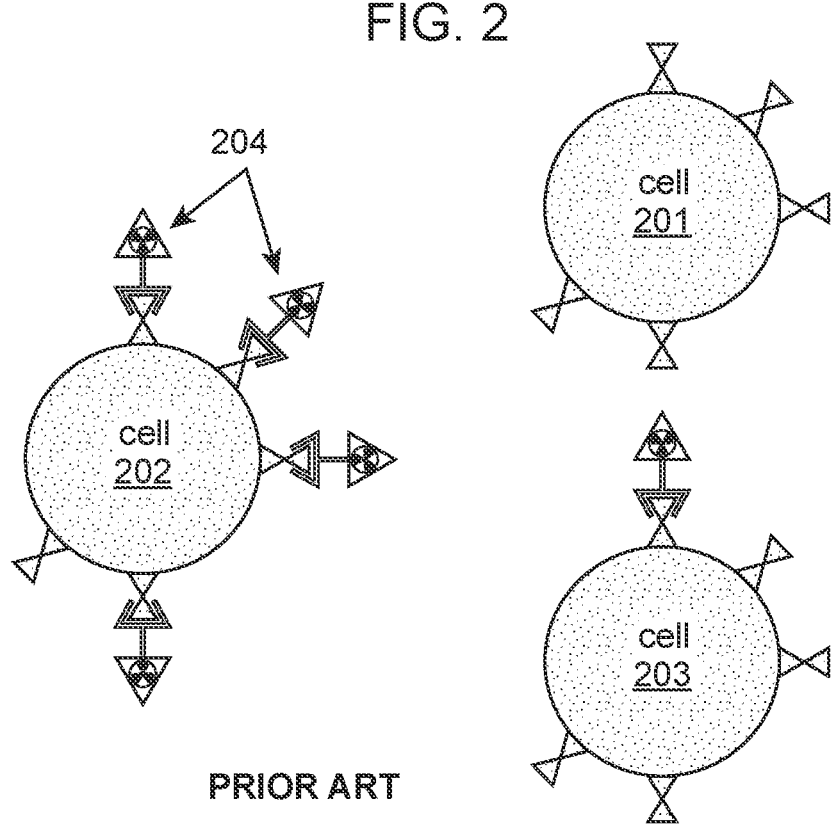
FIG. 2 a plurality of cells each exhibiting different levels of radiation.

By "particle", it is meant a discrete component of a biological sample such as a molecule, analyte-bound bead, individual cell, or the like. In some cases, particles of interest may be radiolabeled. In such cases, radiolabeled particles may be subsequently employed to, e.g., deliver radiation to targeted tissues using radioisotopes attached to biologically active ligands. For example, radioactively labelled antibodies allow for the targeted delivery of radioactivity to cells that are specific to a complimentary antigen. FIG. 1 depicts such a radioisotope 102 that has been targeted to cell 101 via ligand 103. Depending on the type of radioisotope used, the radiation will involve emission of α-particles, β-particles and high energy photons (γ-rays and x-rays). The radioisotope $^{125}$I will, for example, emit a characteristic 35.5 keV photon. Radioactive biomolecules can be targeted to differentially affect cells depending on the number and type of proteins on the cell's surface. FIG. 2 depicts cells 201, 202 and 203 each having a different number of radioisotopes 204 associated therewith. Relative to cells 201 and 203, cell 202 possesses more of the antigens to which the ligand attached to radioisotope 204 is targeted.

Particle analyzers of interest may include a flow cell for transporting particles in a flow stream. As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed herein, a "scintillation counter" is referred to in its conventional sense to describe a device for detecting ionizing radiation. The term "scintillation" is referred to in its conventional sense to describe the phenomenon in which light is produced following the passage of radiation such as α-particles, β-particles and high energy photons (γ-rays and x-rays) through a material. Scintillation counters of interest may include a scintillator and a scintillated light detector operably attached to the scintillator. The scintillator described herein may include any convenient material that exhibits luminescence (i.e., emission of light) when excited by ionizing radiation. Forms of radiation that may be detected include one or more of α-particles, β-particles and high-energy photons (γ-rays and x-rays). In certain cases, the scintillator includes a crystal, such as an organic crystal or an inorganic crystal. Organic crystals are crystals possessing aromatic hydrocarbons (i.e., benzene), and may include, but are not limited to, anthracene ($C_{14}H_{10}$), stilbene ($C_{14}H_{12}$) and naphthalene ($C_{10}H_8$). Inorganic crystals are crystals that are manufactured under high-temperature conditions, and may include, but are not limited to, cesium iodide (CsI) thallium-doped sodium iodide (NaI(TI)), thallium-doped cesium iodide (CsI(TI)), sodium-doped cesium iodide (CsI (Na)), cesium fluoride (CsF), thallium-doped sodium iodide (NaI(Tl)), europium-doped lithium iodide (LiI(Eu)), bismuth germanium oxide ($Bi_4Ge_3O_{12}$), barium fluoride ($BaF_2$), europium-doped calcium fluoride ($CaF_2(Eu)$), silver-activated zinc sulfide (ZnS(µg)), scheelite ($CaWO_4$), cadmium tungstate ($CdWO_4$), cerium(III)-doped yttrium aluminum garnet ($Y_3Al_5O_{12}(Ce)$), gadolinium oxyorthosilicate ($Gd_2SiO_5$), cerium-doped lutetium oxyorthosilicate ($Lu_2(SiO_4)O(Ce)$), or the like. In some embodiments, the scintillator is a liquid scintillator including a scintillating solute within an organic solvent. In such embodiments, scintillating solutes may include, but are not limited to p-Terphenyl, PBD ($C_{20}H_{14}N_2O$), butyl PBD ($C_{24}H_{22}N_2O$), 2,5-Diphenyloxazole ($C_{15}H_{11}NO$) and POPOP ($C_{24}H_{16}N_2O_2$). Organic solvents for use in the liquid scintillator include, but are not limited to, toluene, xylene, benzene, triethylbenzene and decalin. In certain cases, the scintillator is a plastic scintillator (e.g., polyethylene napthalate) having a scintillating material suspended in solid polymeric matrix. In some instances, the scintillator is a gaseous scintillator. Gaseous scintillators may include, but are not limited to, nitrogen, helium, argon, krypton and xenon. In other instances, the scintillator is a glass scintillator. Glass scintillators of interest include, but are not limited to, cerium activated lithium (Li(Ce)) and boron silicates.

Any convenient light detector may be employed as the scintillated light detector described herein. Scintillated light detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the scintillated light detector is a photomultiplier tube, such as a photomultiplier tube (PMT) having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

The subject scintillation counters may further include a photocathode positioned between the scintillator and the scintillated light detector. The "photocathode" discussed herein is referred to in its conventional sense to describe a surface from which electrons can be released via the photoelectric effect. Accordingly, where the subject scintillation counter includes a photocathode, light energy produced by the scintillator may be effectively converted into electrons. Photocathodes of interest may include, but are not limited to, one or more of silver-oxygen-cesium (Ag—O—Cs), antimony-cesium (Sb—Cs), antimony-rubidium-cesium (Sb—Rb—Cs), antimony-potassium-cesium (Sb—K—Cs), sodium-potassium-antimony (Na—K—Sb), sodium-potassium-antimony-cesium (Na—K—Sb—Cs), gallium (II) arsenide (GaAs), indium gallium arsenide (InGaAs), cesium-telluride (Cs—Te), and cesium iodide (Cs—I).

In some instances, the scintillator is optically opaque. In such instances, the opacity of the scintillator prevents non-scintillated light from being detected by the scintillated light detector. Non-scintillated light may include, for example, light emitted by the light source and particle-modulated light. Preventing the detection of non-scintillated light by the scintillated light detector may, in some cases, improve the signal-to-noise ratio that is observed with respect to assessing particle radioactivity via the scintillation counter. Opacity of the scintillator may be achieved by any convenient mechanism. In some embodiments, the scintillator is made of an optically opaque material, i.e.; such that non-scintillated light does not pass therethrough. In additional embodiments, the scintillator includes an opaque coating applied thereto, which opaque coating allows gamma and x rays to enter, but not visible light. Any convenient opaque coating may be employed. In certain cases, the opaque coating includes a polyester film such as mylar (biaxially-oriented polyethylene terephthalate), or the like. In embodiments, the opaque coating includes a metalized film, such as aluminized Mylar.

Particle analyzers of interest may include any convenient number of scintillation counters. In some embodiments, particle analyzers include a single (i.e., 1) scintillation counter. In other embodiments, particle analyzers include a plurality of scintillation counters, such as 2 or more scintillation counters, 3 or more scintillation counters, 4 or more scintillation counters, 5 or more scintillation counters, 6 or more scintillation counters, 7 or more scintillation counters, 8 or more scintillation counters, 9 or more scintillation counters, and including 10 or more scintillation counters. Where particle analyzers include multiple scintillation counters, the type of radiation that each scintillation counter is configured to detect may be the same or different. For example, in embodiments where the particle analyzers include 2 scintillation counters, the first scintillation counter may be configured to detect α-particles (e.g., by including a scintillating material such as zinc sulfide), and the second scintillation counter may be configured to detect β-particles (e.g., by including a plastic scintillating material). In other embodiments, the first scintillation counter may be configured to detect high-energy photons (e.g., by including a crystalline scintillating material), and the second scintillation counter may be configured to detect β-particles. In still other embodiments, both the first and second scintillation counters may be configured to detect high-energy photons, and so on.

In some embodiments, the subject particle analyzers include one or more scintillation counters positioned within the flow cell. By "positioned within the flow cell" it is meant that one or more components of a scintillation counter (e.g., scintillator, scintillated light detector, photocathode) is located within the flow chamber, i.e., the cavity through which the flow stream transports particles. Scintillation counters may be affixed to the interior of the flow cell via any convenient protocol. In certain cases, the scintillation counter is affixed to the interior of the flow cell via an adhesive. Any convenient adhesive may be employed during the integration of the scintillation counter with the flow cell. For example, adhesives of interest may include epoxies, light curable acrylics, elastomers (e.g., silicone, silicone-free silane), cyanoacrylates, and structural adhesives (e.g., those having a resin and activator). In some embodiments, the adhesive is curable by exposure to light (e.g., UV light). In additional embodiments, one or more components of the scintillation counter may be incorporated into the structure of the flow cell. In certain cases, one or components of the scintillation counter may be incorporated into the structure of the flow cell via a press fit (i.e., interference fit). Press fit is a known technique whereby a hole that is slightly smaller than the shape of the scintillation counter may be generated in the flow cell. The scintillation counter and the flow cell may subsequently be held together by friction after the two elements are joined. In further embodiments, the scintillation counter may be positioned within the flow cell via one or more clamps, magnets, latches, notches, countersinks, counter-bores, grooves, pins, tethers, hinges, or combinations thereof.

In certain cases, the scintillation counter is in receiving relationship with the flow cell. By "receiving relationship", it is meant that the scintillation counter is positioned at a location that is adjacent to the flow cell (i.e., as opposed to being located within the flow cell). The scintillation counter may, in some embodiments, be attached to an outer surface of the flow cell. In such embodiments, the scintillation counter may be attached via any convenient protocol. For example, the scintillation counter may be attached via an adhesive, such as those described above. In other instances, the scintillation counter may be separated from the outer surface of the flow cell by a distance. The scintillation counter may be separated from the outer surface of the flow cell by any convenient distance, such as where the distance ranges from 0.1 mm to 30 mm, such as 0.5 mm to 20 mm and including 1 mm to 10 mm.

The scintillation counters described herein may be positioned at any convenient location with respect to the flow cell. For example, in certain cases, the scintillation counter is positioned at an upstream position relative to interrogation point. In other cases, the scintillation counter is positioned at a downstream location relative to the interrogation point. The terms "upstream" and "downstream" are employed to denote the location of the scintillation counter in reference to the direction in which the flow stream propagates. The subject scintillation counter may be located within the flow cell at any convenient distance relative to the interrogation point, such as where the scintillation counter is separated from the interrogation point by a distance ranging from 0.1 to 50 mm, such as 0.5 to 30 mm, including 0.5 to 15 mm. In some instances, the distance separating the interrogation point and the scintillation counter is measured from the latitudinal position of the interrogation point relative to the flow stream and the latitudinal position of the scintillation counter relative to the flow stream.

Figure 3:
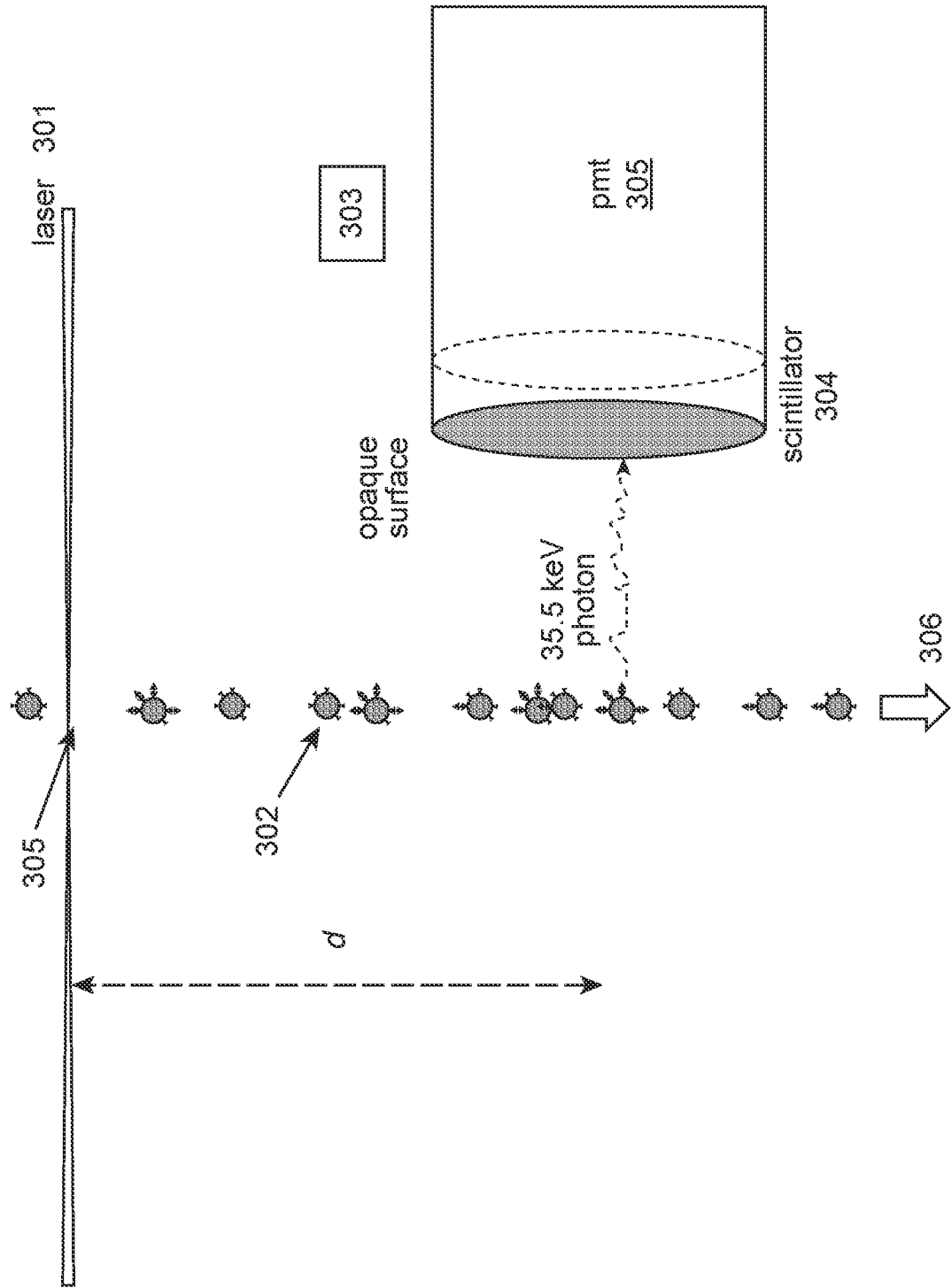
FIG. 3 depicts a flow cell having a scintillation counter according to certain embodiments.

FIG. 3 depicts a particle analyzer having a scintillation counter according to certain embodiments. As shown in FIG. 3, particles 302 are transported in a flow stream in the direction denoted by arrow 306. Laser 301 emits a beam that irradiates particles 302 at irradiation point 305. Scintillation counter 303 includes a scintillator 304 having an opaque surface and a scintillated light detector 305. Radioactive labels associated with individual particles emit radiation, such as high-energy photons. Scintillator 304 converts energy from the high energy photons into light energy, which is subsequently detected by scintillated light detector 305. Scintillation counter 303 is separated from interrogation point 305 by known distance d.

In some embodiments, the subject particle analyzers include a particle injection conduit. As discussed herein, a "particle injection conduit" refers to a component for injecting particles into the flow cell at a proximal end. Where particle analyzers include a particle injection conduit, particles in a sheath fluid pass through the conduit before entering the flow cell for analysis. In such cases, an orifice of the particle injection conduit may be positioned in line with a flow cell orifice at the proximal end. Any convenient conduit for fluid communication may be employed as the particle injection conduit described herein. In certain instances, the particle injection conduit may include a hose, tubing, or flexible ducting. In some embodiments, the particle injection conduit includes an elongated tubing.

The particle injection conduit may be composed of any convenient material. In some cases, the particle injection conduit includes a polymeric material, such as a plastic material. Plastic materials of interest include, but are not limited to: polytetrafluoroethylene (PTFE), polyetheretherketone (PEEK), fluorinated ethylene-propylene (FEP), ethylene tetrafluoroethylene (ETFE), polypropylene (PP), or the like. The cross-sectional shape of the particle injection conduit may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The particle injection conduit may have any suitable length. For example, where the particle injection conduit includes elongated tubing, the length of the elongated tubing may range from 0.5 to 300 mm, such as 1.0 to 100 mm, including 2 to 50 mm, e.g., 5 to 25 mm. In some embodiments, the particle injection conduit is configured to fit within a volume of a given size. For example, where the particle injection conduit includes an elongated tubing, the elongated tubing may be configured to fit within a space ranging from 125 $mm^3$ to 30,000 $mm^3$. In such cases, the elongated tubing may be coiled. In other words, the elongated tubing may be wound around a central axis.

Where the subject particle analyzers include a particle injection conduit, one or more scintillation counters may be attached to the particle injection conduit. The one or more scintillation counters may be attached to the particle injection conduit via any convenient protocol. In some embodiments, the scintillation counter is attached to the outside of the particle injection conduit, for example, with a clamp. In other embodiments, one or more components of the scintillation counter (e.g., scintillator, scintillated light detector, photocathode) are incorporated into the structure of the particle injection conduit. For example, the scintillation counter may be positioned within a wall of the particle injection conduit via adhesives or press fit (e.g., as described above).

In some embodiments, the subject particle analyzers include a particle ejection conduit. As discussed herein, a "particle ejection conduit" refers to a component for ejecting particles from the flow cell at a distal end. Following ejection from the particle ejection component, the particles may be directed to a waste receptacle, or one or more collection vessels for later use, as desired. Where particle analyzers include a particle ejection conduit, an orifice of the particle ejection conduit may be positioned in line with a flow cell orifice at the distal end. Any convenient conduit for fluid communication may be employed as the particle ejection conduit described herein. In certain instances, the particle ejection conduit includes a hose, tubing, or flexible ducting. In some embodiments, the particle ejection conduit includes an elongated tubing.

The particle ejection conduit may be composed of any convenient material. In some cases, the particle ejection conduit includes a polymeric material, such as a plastic material. Plastic materials of interest include but are not limited to: polytetrafluoroethylene (PTFE), polyetheretherketone (PEEK), fluorinated ethylene-propylene (FEP), ethylene tetrafluoroethylene (ETFE), polypropylene (PP), or the like. The cross-sectional shape of the particle ejection conduit may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The particle ejection conduit may have any suitable length. For example, where the particle ejection conduit includes elongated tubing, the length of the elongated tubing may range from 0.5 to 300 mm, such as 1.0 to 100 mm, including 2 to 50 mm, e.g., 5 to 25 mm. In some embodiments, the particle ejection conduit is configured to fit within a volume of a given size. For example, where the particle ejection conduit includes an elongated tubing, the elongated tubing may be configured to fit within a space ranging 125 mm$^3$ to 30,000 mm$^3$. In such cases, the elongated tubing may be coiled. In other words, the elongated tubing may be wound around a central axis.

Where the subject particle analyzers include a particle ejection conduit, one or more scintillation counters may be attached to the particle ejection conduit. The one or more scintillation counters may be attached to the particle ejection conduit via any convenient protocol. In some embodiments, the scintillation counter is attached to the outside of the particle ejection conduit, for example, with a clamp. In other embodiments, one or more components of the scintillation counter (e.g., scintillator, scintillated light detector, photocathode) are incorporated into the structure of the particle ejection conduit. For example, the scintillation counter may be positioned within a wall of the particle ejection conduit via adhesives or press fit (e.g., as described above).

Figure 4:
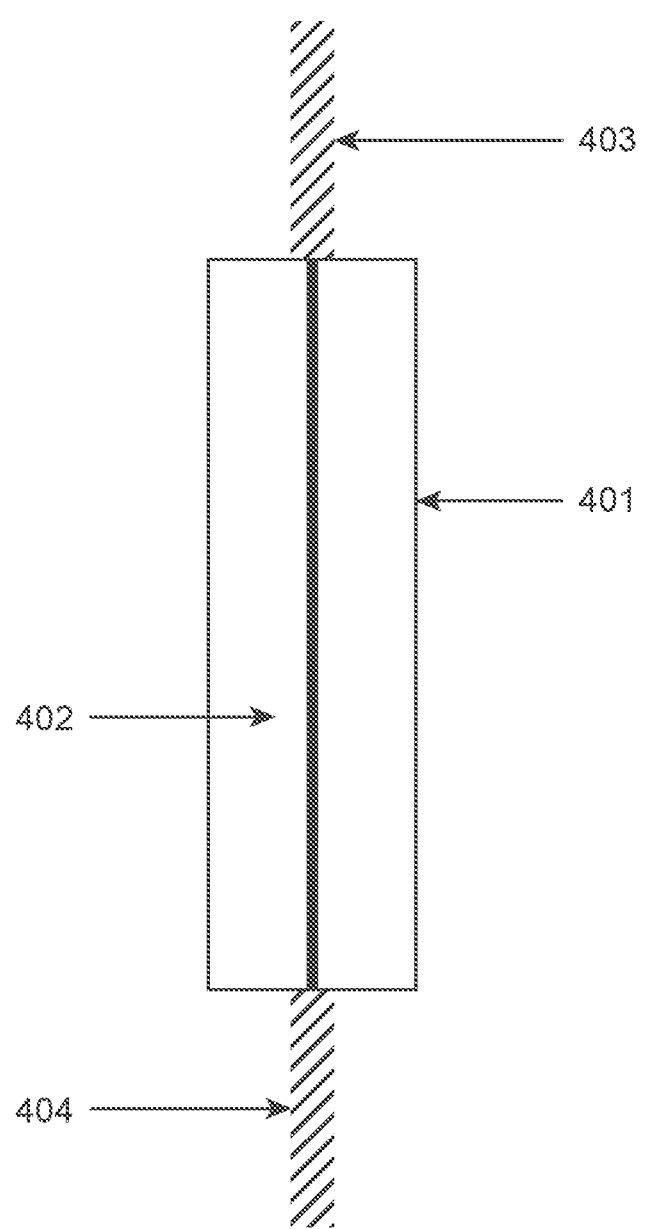
FIG. 4 depicts a flow cell having a particle injection conduit and a particle ejection conduit according to certain embodiments.

FIG. 4 depicts a flow cell having a particle injection conduit at a proximal end and a particle ejection conduit at a distal end. As shown in FIG. 4, flow cell 401 possesses a flow stream 402 running therethrough. Particle injection conduit 403 includes coiled tubing and is attached to flow cell 401 at a proximal end. Particle ejection conduit 404 includes coiled tubing and is positioned at a distal end of flow cell 401. Scintillation counters (not pictured) may be attached to one or more of flow cell 401, particle injection conduit 403 and particle ejection conduit 404.

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 μm or greater increments, such as 0.05 μm or greater, such as 0.1 μm or greater, such as 0.5 μm or greater such as 1 μm or greater, such as 10 μm or greater, such as 100 μm or greater, such as 500 μm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, particle analyzers of interest may further include one or more particle-modulated light detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more particle-modulated light detector(s) may include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

In some embodiments, the subject particle analyzers are operated in conjunction with programmable logic that may be implemented in hardware, software, firmware, or any combination thereof in order to, e.g., assess particle radioactivity. For example, where programmable logic is implemented in software, radioactivity assessment may be realized at least in part by a computer-readable data storage medium comprising program code including instructions that, when executed, is configured to receive particle-modulated light intensity data and particle radioactivity data from the particle-modulated light detector and the scintillation counter, respectively, and associate the received particle-modulated light intensity data and particle radioactivity data with a given particle. In certain cases, the program code includes instructions for associating the received particle-modulated light intensity data and particle radioactivity data with the given particle based on the amount of elapsed time between the time point at which particle-modulated light is detected and the time point at which the radioactivity of the particle is assessed. In other words, a time ($t_1$) at which a given particle is assessed by the particle-modulated light detector and a time ($t_2$) at which a given particle is assessed by the scintillation detector is recorded. Based on the amount of time ($t_2$-$t_1$) it takes for the particle to travel a known distance (d) between the interrogation point and the scintillation counter at a known flow rate, data recorded by each of the particle-modulated light detector and the scintillation counter is associated with the particle. Where the flow cell includes a scintillation counter attached to a particle injection conduit or a particle ejection conduit, the known distance (d) includes the length of the conduit through which particles travel between the location at which radioactivity is assessed and the location at which particle-modulated light is assessed. Accordingly, the radioactivity status and physical characteristics of each particle may be known simultaneously.

In additional embodiments, the programmable logic may be configured to provide a bulk assessment of sample radioactivity. By "bulk" assessment, it is meant an assessment of the general radioactivity of an entire sample or a particular subset thereof (i.e., as opposed to an assessment of every individual particle). For example, in some embodiments, the bulk assessment may include an average level of ionizing radiation for the sample.

The subject programmable logic may be implemented in any of a variety of devices such as specifically programmed event processing computers, wireless communication devices, integrated circuit devices, or the like. In some embodiments, the programmable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec to 2500 μL/sec, such as 50 μL/sec to 1000 μL/sec, and including 75 μL/sec or more to 750 μL/sec.

In some embodiments, the sheath fluid injection port is an orifice positioned in a wall of the inner chamber. In other embodiments where the particle analyzer includes a particle injection conduit, the sheath fluid injection port may be positioned at a proximal end of a particle injection conduit. In such embodiments, sheath fluid is provided to the flow cell via the particle injection conduit. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 5:
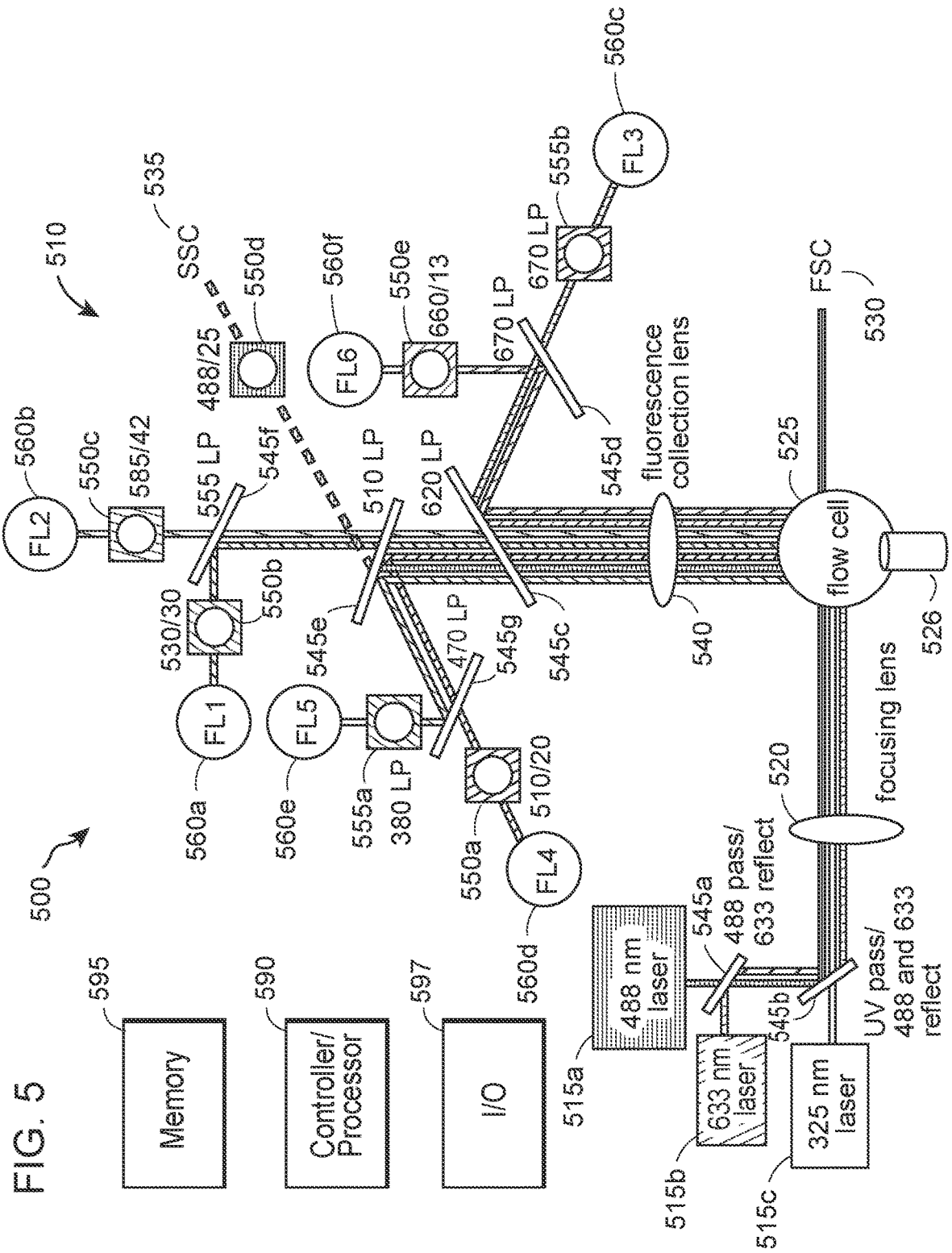
FIG. 5 depicts a functional block diagram of a flow cytometric system according to certain embodiments.

FIG. 5 shows a particle analyzer 500 for flow cytometry in accordance with an illustrative embodiment of the present invention. The particle analyzer 500 includes a flow cytometer 510, a controller/processor 590 and a memory 595. The flow cytometer 510 includes one or more excitation lasers 515a-515c, a focusing lens 520, a flow chamber 525, a scintillation counter 526, a forward-scatter detector 530, a side-scatter detector 535, a fluorescence collection lens 540, one or more beam splitters 545a-545g, one or more bandpass filters 550a-550e, one or more longpass ("LP") filters 555a-555b, and one or more fluorescent detectors 560a-560f.

The excitation lasers 515a-c emit light in the form of a laser beam. The wavelengths of the laser beams emitted from excitation lasers 515a-515c are 488 nm, 633 nm, and 325 nm, respectively, in the example system of FIG. 5. The laser beams are first directed through one or more of beam splitters 545a and 545b. Beam splitter 545a transmits light at 488 nm and reflects light at 633 nm. Beam splitter 545b transmits UV light (light with a wavelength in the range of 10 to 400 nm) and reflects light at 488 nm and 633 nm.

The laser beams are then directed to a focusing lens 520, which focuses the beams onto the portion of a fluid stream where particles of a sample are located, within the flow chamber 525. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer. As shown in FIG. 5, flow chamber 525 includes a scintillation counter positioned therein for assessing particle radioactivity (e.g., as discussed above)

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 530, the side-scatter detector 535, and the one or more fluorescent detectors 560a-560f through one or more of the beam splitters 545c-545g, the bandpass filters 550a-550e, the longpass filters 555a-555b, and the fluorescence collection lens 540.

The fluorescence collection lens 540 collects light emitted from the particle-laser beam interaction and routes that light towards one or more beam splitters and filters. Bandpass filters, such as bandpass filters 550a-550e, allow a narrow range of wavelengths to pass. For example, bandpass filter 550a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 555a-555b, transmit wavelengths of light equal to or longer than a specified wavelength of light. For example, longpass filter 555b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 530 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 535 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 560a-560f. The side-scatter detector 535 and fluorescent detectors can include photomultiplier tubes. The signals detected at the forward-scatter detector 530, the side-scatter detector 535 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 5, but can include any flow cytometer known in the art. For example, a flow cytometer may have any number of lasers, beam splitters, filters, and detectors at various wavelengths and in various different configurations.

In operation, cytometer operation is controlled by a controller/processor 590, and the measurement data from the detectors can be stored in the memory 595 and processed by the controller/processor 590. Although not shown explicitly, the controller/processor 590 is coupled to the detectors to receive the output signals therefrom, and may also be coupled to electrical and electromechanical components of the flow cytometer 510 to control the lasers, fluid flow parameters, and the like. Input/output (I/O) capabilities 597 may be provided also in the system. The memory 595, controller/processor 590, and I/O 597 may be entirely provided as an integral part of the flow cytometer 510. In such an embodiment, a display may also form part of the I/O capabilities 597 for presenting experimental data to users of the cytometer 510. Alternatively, some or all of the memory 595 and controller/processor 590 and I/O capabilities may be part of one or more external devices such as a general purpose computer. In some embodiments, some or all of the memory 595 and controller/processor 590 can be in wireless or wired communication with the cytometer 510. The controller/processor 590 in conjunction with the memory 595 and the I/O 597 can be configured to perform various functions related to the preparation and analysis of a flow cytometer experiment.

The system illustrated in FIG. 5 includes six different detectors that detect fluorescent light in six different wavelength bands (which may be referred to herein as a "filter window" for a given detector) as defined by the configuration of filters and/or splitters in the beam path from the flow cell 525 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. The I/O 597 can be configured to receive data regarding a flow cytometer experiment having a panel of fluorescent labels and a plurality of cell populations having a plurality of markers, each cell population having a subset of the plurality of markers. The I/O 597 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 595. The controller/processor 590 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 6:
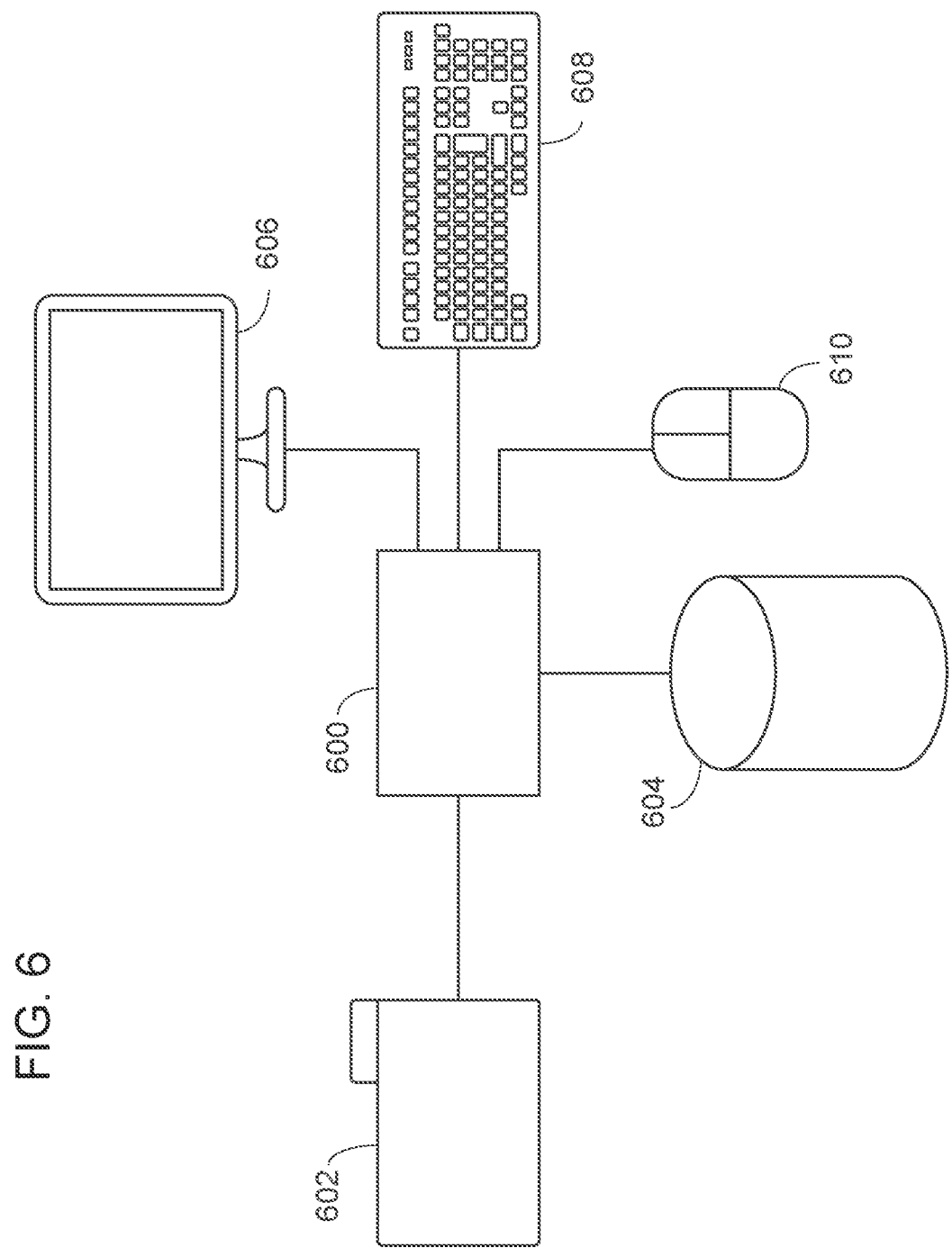
FIG. 6 depicts a sorting control system according to certain embodiments.

FIG. 6 shows a functional block diagram for one example of a sorting control system, such as a processor 600, for analyzing and displaying biological events. A processor 600 can be configured to implement a variety of processes for controlling graphic display of biological events.

A flow cytometer or sorting system 602 can be configured to acquire biological event data. For example, a flow cytometer can generate flow cytometric event data (e.g., particle-modulated light data) and radioactivity data. The flow cytometer 602 can be configured to provide biological event data to the processor 600. A data communication channel can be included between the flow cytometer 602 and the processor 600. The biological event data can be provided to the processor 600 via the data communication channel.

The processor 600 can be configured to receive biological event data from the flow cytometer 602. The biological event data received from the flow cytometer 602 can include flow cytometric event data. The processor 600 can be configured to provide a graphical display including a first plot of biological event data to a display device 606. The processor 600 can be further configured to render a region of interest as a gate around a population of biological event data shown by the display device 606, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 600 can be further configured to display the biological event data on the display device 606 within the gate differently from other events in the biological event data outside of the gate. For example, the processor 600 can be configured to render the color of biological event data contained within the gate to be distinct from the color of biological event data outside of the gate. The display device 606 can be implemented as a monitor, a tablet computer, a smartphone, or other electronic device configured to present graphical interfaces.

The processor 600 can be configured to receive a gate selection signal identifying the gate from a first input device. For example, the first input device can be implemented as a mouse 610. The mouse 610 can initiate a gate selection signal to the processor 600 identifying the gate to be displayed on or manipulated via the display device 606 (e.g., by clicking on or in the desired gate when the cursor is positioned there). In some implementations, the first device can be implemented as the keyboard 608 or other means for providing an input signal to the processor 600 such as a touchscreen, a stylus, an optical detector, or a voice recognition system. Some input devices can include multiple inputting functions. In such implementations, the inputting functions can each be considered an input device. For example, as shown in FIG. 6, the mouse 610 can include a right mouse button and a left mouse button, each of which can generate a triggering event.

The triggering event can cause the processor 600 to alter the manner in which the data is displayed, which portions of the data is actually displayed on the display device 606, and/or provide input to further processing such as selection of a population of interest for particle sorting.

In some embodiments, the processor 600 can be configured to detect when gate selection is initiated by the mouse 610. The processor 600 can be further configured to automatically modify plot visualization to facilitate the gating process. The modification can be based on the specific distribution of biological event data received by the processor 600.

The processor 600 can be connected to a storage device 604. The storage device 604 can be configured to receive and store biological event data from the processor 600. The storage device 604 can also be configured to receive and store flow cytometric event data from the processor 600. The storage device 604 can be further configured to allow retrieval of biological event data, such as flow cytometric event data, by the processor 600.

The display device 606 can be configured to receive display data from the processor 600. The display data can comprise plots of biological event data and gates outlining sections of the plots. The display device 606 can be further configured to alter the information presented according to input received from the processor 600 in conjunction with input from the flow cytometer 602, the storage device 604, the keyboard 608, and/or the mouse 610.

In some implementations the processor 600 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 7A:
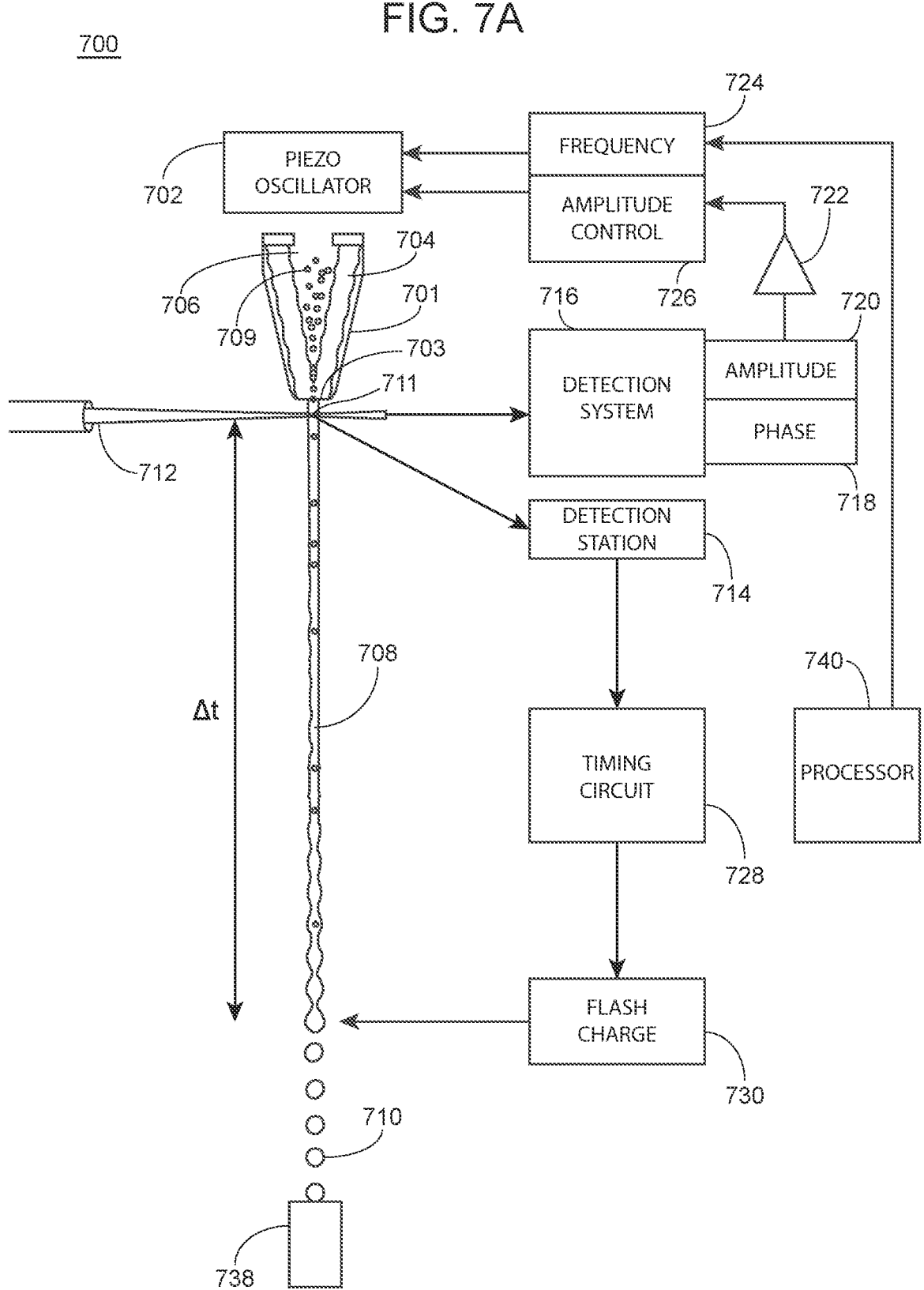
FIG. 7A-B depict a schematic drawing of a particle sorter system according to certain embodiments.

FIG. 7A is a schematic drawing of a particle sorter system 700 (e.g., the flow cytometer 602) in accordance with one embodiment presented herein. In some embodiments, the particle sorter system 700 is a cell sorter system. As shown in FIG. 7A, a drop formation transducer 702 (e.g., piezo-oscillator) is coupled to a fluid conduit 701, which can be coupled to, can include, or can be, a nozzle 703. Within the fluid conduit 701, sheath fluid 704 hydrodynamically focuses a sample fluid 706 comprising particles 709 into a moving fluid column 708 (e.g. a stream). Within the moving fluid column 708, particles 709 (e.g., cells) are lined up in single file to cross a monitored area 711 (e.g., where laser-stream intersect), irradiated by an irradiation source 712 (e.g., a laser). Vibration of the drop formation transducer 702 causes moving fluid column 708 to break into a plurality of drops 710, some of which contain particles 709.

In operation, a detection station 714 (e.g., an event detector) identifies when a particle of interest (or cell of interest) crosses the monitored area 711. Detection station 714 feeds into a timing circuit 728, which in turn feeds into a flash charge circuit 730. At a drop break off point, informed by a timed drop delay (at), a flash charge can be applied to the moving fluid column 708 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 7A, the drops can be collected in a drain receptacle 738.

A detection system 716 (e.g. a drop boundary detector) serves to automatically determine the phase of a drop drive signal when a particle of interest passes the monitored area 711. An exemplary drop boundary detector is described in U.S. Pat. No. 7,679,039, which is incorporated herein by reference in its entirety. The detection system 716 allows the instrument to accurately calculate the place of each detected particle in a drop. The detection system 716 can feed into an amplitude signal 720 and/or phase 718 signal, which in turn feeds (via amplifier 722) into an amplitude control circuit 726 and/or frequency control circuit 724. The amplitude control circuit 726 and/or frequency control circuit 724, in turn, controls the drop formation transducer 702. The amplitude control circuit 726 and/or frequency control circuit 724 can be included in a control system.

In some implementations, sort electronics (e.g., the detection system 716, the detection station 714 and a processor 740) can be coupled with a memory configured to store the detected events and a sort decision based thereon. The sort decision can be included in the event data for a particle. In some implementations, the detection system 716 and the detection station 714 can be implemented as a single detection unit or communicatively coupled such that an event measurement can be collected by one of the detection system 716 or the detection station 714 and provided to the non-collecting element.

Figure 7B:
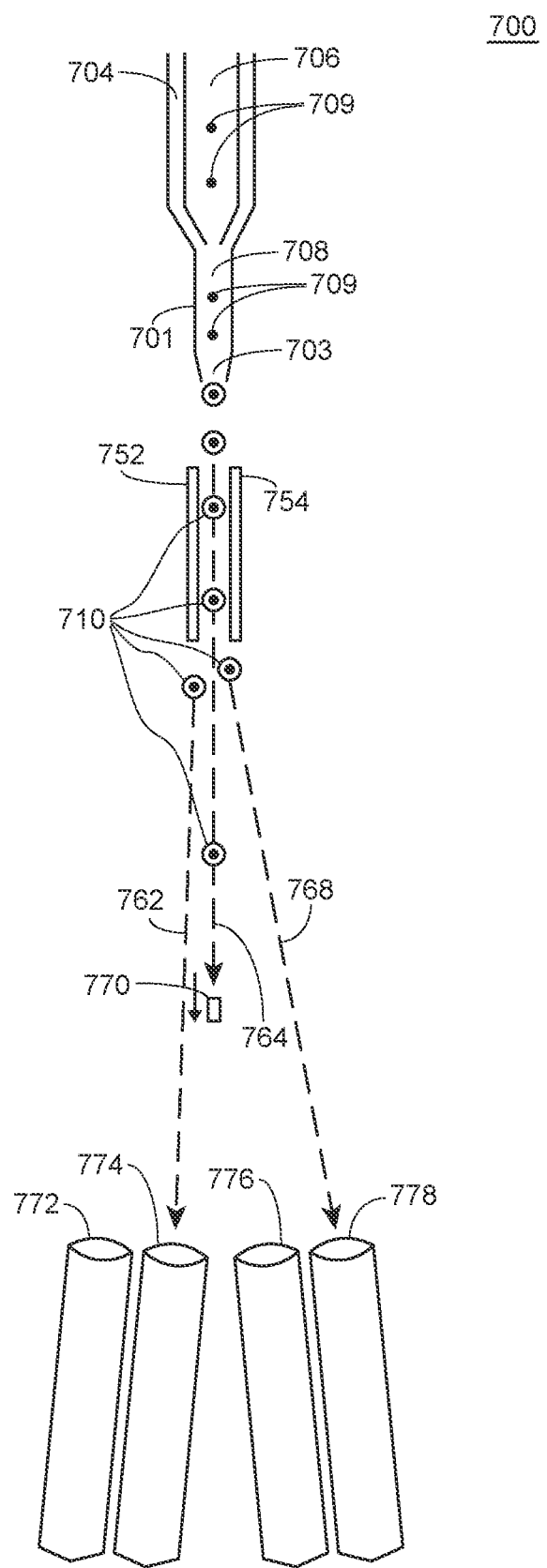

FIG. 7B is a schematic drawing of a particle sorter system, in accordance with one embodiment presented herein. The particle sorter system 700 shown in FIG. 7B, includes deflection plates 752 and 754. A charge can be applied via a stream-charging wire in a barb. This creates a stream of droplets 710 containing particles 709 for analysis. The particles can be illuminated with one or more light sources (e.g., lasers) to generate light scatter and fluorescence information. The information for a particle is analyzed such as by sorting electronics or other detection system (not shown in FIG. 7B). The deflection plates 752 and 754 can be independently controlled to attract or repel the charged droplet to guide the droplet toward a destination collection vessel (e.g., one of 772, 774, 776, or 778). As shown in FIG. 7B, the deflection plates 752 and 754 can be controlled to direct a particle along a first path 762 toward the vessel 774 or along a second path 768 toward the vessel 778. If the particle is not of interest (e.g., does not exhibit scatter or illumination information within a specified sort range), deflection plates may allow the particle to continue along a flow path 764. Such uncharged droplets may pass into a waste receptacle such as via aspirator 770.

The sorting electronics can be included to initiate collection of measurements, receive fluorescence signals for particles, and determine how to adjust the deflection plates to cause sorting of the particles. Example implementations of the embodiment shown in FIG. 7B include the BD FACSAria™ line of flow cytometers commercially provided by Becton, Dickinson and Company (Franklin Lakes, NJ).

Methods of Analyzing a Sample

As discussed above, aspects of the invention also include methods for analyzing a sample. Methods of interest include introducing a sample into a particle analyzer (e.g., a flow cytometer) that includes a flow cell for transporting particles in a flow stream, a light source for irradiating a particle in the flow stream at an interrogation point, a particle-modulated light detector for detecting light from the interrogation point, and a scintillation counter for assessing particle radioactivity. Methods of the disclosure further include obtaining particle-modulated light intensity data and particle radioactivity data from the particle-modulated light detector and the scintillation counter, respectively, to analyze the sample.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label or radioactive label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In some instances, methods include preparing a radiolabeled sample for analysis. Labels of interest may include but are not limited to: tritium ($^3$H), $^{11}$C, $^{14}$C, $^{32}$P, $^{35}$S, $^{45}$Ca, $^{18}$F, $^{89}$Sr, $^{125}$I and $^{131}$I, or the like. In some instances, radioactive labels are conjugated to a biomolecule (e.g., antibody) having an affinity for a particular antigen, such as the cell surface antigens discussed above. In some embodiments, the antigen is a cancer-associated antigen. Cancer-associated antigens include, but are not limited to: α-folate receptor; carbonic anhydrase IX (CAIX); CD19; CD20; CD22; CD30; CD33; CD44v7/8; carcinoembryonic antigen (CEA); epithelial glycoprotein-2 (EGP-2); epithelial glycoprotein-40 (EGP-40); folate binding protein (FBP); fetal acetylcholine receptor; ganglioside antigen GD2; Her2/neu; IL-13R-a2; kappa light chain; LeY; L1 cell adhesion molecule; melanoma-associated antigen (MAGE); MAGE-A1; mesothelin; MUC1; NKG2D ligands; oncofetal antigen (h5T4); prostate stem cell antigen (PSCA); prostate-specific membrane antigen (PSMA); tumor-associate glycoprotein-72 (TAG-72); vascular endothelial growth factor receptor-2 (VEGF-R2); and epidermal growth factor receptor (EGFR) vIII polypeptide.

Radiolabeled samples may be prepared via any convenient protocol. Techniques for conjugating radioactive moiety to an antibody and applying a radiolabeled antibody to a target cell are described in, for example, ed. Hellstrom et al. (1987) "Antibodies for Drug Delivery," in Controlled Drug Delivery, ed. Pinchera et al. pp. 475-506 (Editrice Kurtis, Milano, Italy, 1985); "Analysis, Results, and Future Prospective of the Therapeutic Use of Radiolabeled Antibody in Cancer Therapy," in Monoclonal Antibodies for Cancer Detection and Therapy, ed. Baldwin et al. (Academic Press, New York, 1985), pp. 303-316; and Thorpe et al. (1982) Immunol. Rev. 62:119-158, the disclosures of which are herein incorporated by reference.

In practicing the subject methods, an amount of an initial fluidic sample is injected into the particle analyzer. The amount of sample injected into the particle analyzer may vary, for example, ranging from 0.001 mL to 1000 mL, such as from 0.005 mL to 900 mL, such as from 0.01 mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and, optionally, sorting particles (e.g., radiolabeled particles) in a sample. In practicing the subject methods, the fluidic sample including the particles is first introduced into the flow cell, optionally via a particle injection conduit. The particles are passed substantially one at a time through the sample interrogation point where each of the particles is irradiated by a light source and measurements of light scatter parameters and, in some instances, fluorescent emissions as desired (e.g., two or more light scatter parameters and measurements of one or more fluorescent emissions) are separately recorded for each particle. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In embodiments of the method, detectors, such as photomultiplier tubes (PMT), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (FSC), side-scatter (SSC), and fluorescence emissions include a separate parameter for each particle (or each "event"). Thus, for example, two, three or four parameters can be collected (and recorded) from a particle labeled with two different fluorescence markers.

In certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

As discussed above, methods of interest further include assessing the radioactivity of the sample particles. In some embodiments, sample analysis includes obtaining particle-modulated light intensity data and particle radioactivity data from an individual particle among a plurality of particles. In such embodiments, the radioactivity of each particle is assessed and associated with the data obtained from irradiating the particle at the interrogation point (i.e., particle-modulated light intensity data). For example, a given particle may be characterized by radioactivity data and fluorescent light intensity data (i.e., data received from a fluorescent light detector). In further embodiments, the particle may be characterized by radioactivity data and side-scattered light intensity data (i.e., data received from a side-scattered light detector). In still further embodiments, the particle may be characterized by radioactivity data and forward-scattered light intensity data (i.e., data received from a forward-scattered light detector). In still further embodiments, the particle may be characterized by radioactivity data and any combination of fluorescent light intensity data, side-scattered light intensity data and forward-scattered light intensity data. As such, the radioactivity status and other physical characteristics (i.e., as determined by particle-modulated light) of each individual particle may be known, e.g., substantially at the same time.

In other cases, particle analysis includes obtaining particle-modulated light intensity data and aggregate particle radioactivity data from a plurality of particles. In other words, a "bulk" radioactivity analysis is carried out in which the general radioactivity of the sample or a portion thereof is assessed.

In order to assess particle radioactivity, aspects of the subject methods involve analyzing the sample via a scintillation counter. As discussed in detail above, scintillation counters include a scintillator and a scintillated light detector. In some embodiments, scintillation counters also include a photocathode. The scintillator described herein may include any convenient material that exhibits luminescence (i.e., emission of light) when excited by ionizing radiation. Forms of radiation that may be detected include one or more of α-particles, β-particles and high-energy photons (γ-rays and x-rays). In certain cases, the scintillator includes a crystal, such as an organic crystal or an inorganic crystal. Particle analyzers of interest may include any convenient number of scintillation counters. In some embodiments, particle analyzers include a single (i.e., 1) scintillation counter. In other embodiments, particle analyzers include a plurality of scintillation counters, such as 2 or more scintillation counters, 3 or more scintillation counters, 4 or more scintillation counters, 5 or more scintillation counters, 6 or more scintillation counters, 7 or more scintillation counters, 8 or more scintillation counters, 9 or more scintillation counters, and including 10 or more scintillation counters. Where particle analyzers include multiple scintillation counters, the type of radiation that each scintillation counter is configured to detect may be the same or different.

In some embodiments, the particle analyzers of interest in the subject methods include one or more scintillation counters positioned within the flow cell. Scintillation counters may be affixed to the interior of the flow cell via any convenient protocol. In certain cases, the scintillation counter is affixed to the interior of the flow cell via an adhesive. In certain cases, one or components of the scintillation counter may be incorporated into the structure of the flow cell via a press fit (i.e., interference fit). The scintillation counters described herein may be positioned at any convenient location within the flow cell. For example, in certain cases, the scintillation counter is positioned at an upstream position relative to interrogation point. In other cases, the scintillation counter is positioned at a downstream location relative to the interrogation point. The subject scintillation counter may be located within the flow cell at any convenient distance relative to the interrogation point, such as where the scintillation counter is separated from the interrogation point by a distance ranging from 0.1 to 50 mm, such as 0.5 to 25 mm, including 0.5 to 15 mm. In some instances, the distance separating the interrogation point and the scintillation counter is measured from the latitudinal position of the interrogation point relative to the flow stream and the latitudinal position of the scintillation counter relative to the flow stream.

In some embodiments, the particle analyzers of interest for the subject methods include a particle injection conduit. Where particle analyzers include a particle injection conduit, particles in a sheath fluid pass through the conduit before entering the flow cell for analysis. In such cases, an orifice of the particle injection conduit may be positioned in line with a flow cell orifice at the proximal end. Any convenient conduit for fluid communication may be employed as the particle injection conduit described herein. In certain instances, the particle injection conduit may include a hose, tubing, or flexible ducting. In some embodiments, the particle injection conduit includes an elongated tubing. Where the subject particle analyzers include a particle injection conduit, one or more scintillation counters may be attached to the particle injection conduit. The one or more scintillation counters may be attached to the particle injection conduit via any convenient protocol. In some embodiments, the scintillation counter is attached to the outside of the particle injection conduit, for example, with a clamp. In other embodiments, one or more components of the scintillation counter (e.g., scintillator, scintillated light detector, photocathode) are incorporated into the structure of the particle injection conduit.

In some embodiments, particle analyzers of interest for the subject methods include a particle ejection conduit. Where particle analyzers include a particle ejection conduit, an orifice of the particle ejection conduit may be positioned in line with a flow cell orifice at the distal end. Any convenient conduit for fluid communication may be employed as the particle ejection conduit described herein. In certain instances, the particle ejection conduit may include a hose, tubing, or flexible ducting. In some embodiments, the particle ejection conduit includes an elongated tubing. Where the particle analyzers include a particle ejection conduit, one or more scintillation counters may be attached to the particle ejection conduit. The one or more scintillation counters may be attached to the particle ejection conduit via any convenient protocol. In some embodiments, the scintillation counter is attached to the outside of the particle ejection conduit, for example, with a clamp. In other embodiments, one or more components of the scintillation counter (e.g., scintillator, scintillated light detector, photocathode) are incorporated into the structure of the particle ejection conduit. For example, the scintillation counter may be positioned within a wall of the particle ejection conduit via adhesives or press fit (e.g., as described above).

Aspects of the subject methods further include obtaining particle-modulated light intensity data and particle radioactivity data from the particle-modulated light detector and the scintillation counter, respectively, to analyze the sample. In embodiments, analyzing the sample comprises associating the obtained particle-modulated light intensity data and particle radioactivity data with a given particle, for example, via a processor operably coupled to the particle-modulated light detector and the scintillation counter. In such embodiments, methods may include associating the received particle-modulated light intensity data and particle radioactivity data with the given particle based on the amount of elapsed time between the time point at which particle-modulated light is detected and the time point at which the radioactivity of the particle is assessed. In other words, a time ($t_1$) at which a given particle is assessed by the particle-modulated light detector and a time ($t_2$) at which a given particle is assessed by the scintillation detector is recorded. Based on the amount of time ($t_2$-$t_1$) it takes for the particle to travel a known distance (d) between the interrogation point and the scintillation counter at a known flow rate, data recorded by each of the particle-modulated light detector and the scintillation counter is associated with the particle. Where the flow cell includes a scintillation counter attached to a particle injection conduit or a particle ejection conduit, the known distance (d) includes the length of the conduit through which particles travel between the location at which radioactivity is assessed and the location at which particle-modulated light is assessed. Accordingly, the radioactivity status and physical characteristics of each particle may be known. Methods may further include estimating the number of radiolabeled particles present within the plurality of particles based on the received particle radioactivity data. In other words, after the radioactivity of each particle has been assessed, the number of radioactive particles relative to the number of non-radioactive particles may be determined. In some cases, methods also include adjusting the rate with which particles are transported through the flow cell such that the elapsed time ($t_2$-$t_1$) is altered.

The data recorded for each particle is analyzed in real time or stored in a data storage and analysis means, such as a computer, as desired. U.S. Pat. No. 4,284,412 describes the configuration and use of a flow cytometer of interest equipped with a single light source while U.S. Pat. No. 4,727,020 describes the configuration and use of a flow cytometer equipped with two light sources.

Methods in certain embodiments also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward-scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. In certain cases, a gate may be generated around a subpopulation of particles having the same or similar radioactivity status (i.e., having a similar number and/or type of radioisotopes attached thereto). Only those particles within the gate are then further analyzed by plotting the other parameters for these particles, such as fluorescence. Where desired, the above analysis may be configured to yield counts of the particles of interest in the sample.

In some embodiments, methods include sorting the particles based on one or more determined particle characteristics. In certain instances, particles having the same radioactivity status (i.e., having a similar number and/or type of radioisotopes attached thereto) are sorted into a first collection vessel, while other particles are sorted into a second collection vessel or a waste vessel, as desired. In additional instances, particles are sorted based on radioactivity status as well as other physical characteristics as determined by particle-modulated light (i.e., fluorescent light intensity data, side-scattered light intensity data and forward-scattered light intensity data). For example, in some embodiments, particles having the same radiolabel and the same fluorophore(s) are sorted into a first collection vessel, while other particles are sorted into a second collection vessel or a waste vessel, as desired.

Methods of interest may further include employing sorted particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Particle Analyzer

Aspects of the invention further include methods of assembling a particle analyzer (e.g., flow cytometer). Methods of interest include positioning within a particle analyzer a scintillation counter for assessing particle radioactivity. Any suitable scintillation counter having a scintillator and a scintillated light detector may be positioned within the particle analyzer. In some embodiments, the scintillator includes a crystal, such as an organic crystal or an inorganic crystal. Any convenient light detector may be employed as the scintillated light detector. For example, the scintillated light detector may be a photomultiplier tube (PMT). The scintillation counter may, in certain cases, also include a photocathode positioned between the scintillator and the scintillated light detector.

In some embodiments, methods include positioning the scintillation counter within the flow cell. In certain cases, methods include positioning the scintillation counter within the flow cell at a certain distance from the interrogation point, such as where the distance ranges from 100 µm to 500 µm. In some instances, the scintillation counter is positioned within the flow cell at a downstream location relative to the interrogation point. In other instances, the scintillation counter is positioned within the flow cell at an upstream location relative to the interrogation point.

In certain cases, methods include placing the scintillation counter in receiving relationship with the flow cell. The scintillation counter may, in some embodiments, be attached to an outer surface of the flow cell. In such embodiments, the scintillation counter may be attached via any convenient protocol. For example, the scintillation counter may be attached via an adhesive, such as those described above. In other instances, the scintillation counter may be separated from the outer surface of the flow cell by a distance. The scintillation counter may be separated from the outer surface of the flow cell by any convenient distance, such as where the distance ranges from 0.1 mm to 30 mm, such as 0.5 mm to 20 mm and including 1 mm to 10 mm.

Methods of interest may further include attaching one or both of a particle injection conduit and a particle ejection conduit to the proximal and distal ends of the particle analyzer flow cell, respectively. Where methods include attaching a particle injection conduit to the flow cell, an orifice of the particle injection conduit may be positioned in line with a flow cell orifice at the proximal end. Any convenient conduit for fluid communication may be employed as the particle injection conduit described herein. In certain instances, the particle injection conduit may include a hose, tubing, or flexible ducting. In some embodiments, the particle injection conduit includes an elongated tubing. In certain cases, the elongated tubing is coiled. Where methods include attaching a particle ejection conduit to the flow cell, an orifice of the particle ejection conduit may be positioned in line with a flow cell orifice at the distal end. Any convenient conduit for fluid communication may be employed as the particle ejection conduit described herein. In certain instances, the particle ejection conduit may include a hose, tubing, or flexible ducting. In some embodiments, the particle ejection conduit includes an elongated tubing. In certain cases, the elongated tubing is coiled.

Computer-Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for associating received particle-modulated light intensity data and particle radioactivity data with a particle. In embodiments, the computer program includes instructions for receiving particle-modulated light intensity data and particle radioactivity data from a particle via a particle analyzer (e.g., flow cytometer) having a flow cell for transporting particles in a flow stream, a light source for irradiating a particle in the flow stream at an interrogation point, a particle-modulated light detector for detecting light from the interrogation point, and a scintillation counter for assessing particle radioactivity. Instructions may further include associating the received particle-modulated light intensity data and particle radioactivity data with the particle comprises determining the amount of elapsed time between the time point at which particle-modulated light is detected and the time point at which the radioactivity of the particle is assessed. For example, a time ($t_1$) at which a given particle is assessed by the particle-modulated light detector and a time ($t_2$) at which a given particle is assessed by the scintillation detector is recorded. Based on the amount of time ($t_2$-$t_1$) it takes for the particle to travel a known distance (d) between the interrogation point and the scintillation counter at a known flow rate, data recorded by each of the particle-modulated light detector and the scintillation counter is associated with the particle. Where the flow cell includes a scintillation counter attached to a particle injection conduit or a particle ejection conduit, the known distance (d) includes the length of the conduit through which particles travel between the location at which radioactivity is assessed and the location at which particle-modulated light is assessed. Accordingly, the radioactivity status and physical characteristics of each particle may be known simultaneously.

In certain cases, the computer program further comprises instructions for estimating the number of radiolabeled particles present within the plurality of particles based on the received particle radioactivity data. In other words, after the radioactivity of each particle has been assessed, the number of radioactive particles relative to the number of non-radioactive particles may be determined. The computer program may also include instructions for adjusting the rate with which particles are transported through the flow cell such that the elapsed time ($t_2$-$t_1$) is altered.

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

FIG. 8 depicts a general architecture of an example computing device 800 according to certain embodiments. The general architecture of the computing device 800 depicted in FIG. 8 includes an arrangement of computer hardware and software components. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and further provide output information for an optional display 850 via the input/output device interface 840. For example, an analysis software (e.g., data analysis software or program such as FlowJo®) stored as executable instructions in the non-transitory memory of the analysis system can display the flow cytometry event data to a user. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. Data may be stored in data storage device 890. The memory 870 may further include computer program instructions and other information for implementing aspects of the present disclosure.

Utility

The subject particle analyzers, methods and computer systems find use in a variety of applications where it is desirable to analyze and, optionally, sort particle components in a sample (e.g., a radioactive sample) in a fluid medium, such as a biological sample, and then store sorted products, e.g., for later use, such as therapeutic use. The present invention particularly finds use where it is desirable to assess the radioactivity of individual particles. While conventional techniques permit the measurement of the collective or aggregate radioactivity of a sample, the present invention allows a user to assess the radioactivity of each individual particle. Particle analyzers, methods and computer systems of the present disclosure may also be employed to obtain particle-modulated light intensity data via a particle-modulated light detector and associate the obtained particle-modulated light intensity data with a particle that has been assessed for radioactivity. Embodiments of the invention also find use where it is desirable to provide a flow cytometer with improved cell sorting accuracy, enhanced particle collection, particle charging efficiency, more accurate particle charging and enhanced particle deflection during cell sorting.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include one or more components of the claimed particle analyzers. Embodiments of the subject kits may include one or more scintillation counters, such as those including a scintillator and a scintillated light detector. Kits according to certain embodiments may also include one or more flow cells having scintillation counters positioned therein (e.g., via adhesive or press fit). The scintillation counters may include any convenient scintillator, such as an organic or inorganic crystal. In addition, the scintillated light detector may include any convenient light detector, such as photomultiplier tube (PMT). In embodiments, kits of the present disclosure may include a particle injection conduit, a particle ejection conduit, or both. The particle injection conduit(s) and particle ejection conduit(s) may include a hose, tubing, or flexible ducting. In some embodiments, the conduits include elongated tubing, such as coiled elongated tubing.

Kits may also include instructions for assembling a particle analyzer having a scintillation counter. In some embodiments, the kits include instructions for positioning the scintillation counter within the flow cell. In some instances, the instructions are for positioning the scintillation counter within the flow cell at a downstream location relative to the interrogation point. In other instances, the instructions are for positioning the scintillation counter within the flow cell at an upstream location relative to the interrogation point. Where the kits include a particle injection conduit and/or a particle ejection conduit, the subject kits may include instructions for attaching a scintillation counter to the particle injection conduit, the particle ejection conduit, or both. The instructions described herein may be included on storage media such as a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS). Any of these program storage media, or others now in use or that may later be developed, may be included in the subject kits. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112 (6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112 (6) is not invoked.

What is claimed is:

1. A particle analyzer comprising:
   a flow cell for transporting a plurality of particles in a flow stream;
   a light source for irradiating the flow stream at an interrogation point;
   a particle-modulated light detector for detecting light from the interrogation point; and
   a scintillation counter for assessing radioactivity of an individual particle of the plurality of particles.

2. The particle analyzer according to claim 1, wherein the scintillation counter is positioned within the flow cell.

3. The particle analyzer according to claim 2, wherein the scintillation counter is separated from the interrogation point.

4. The particle analyzer according to claim 2, wherein the scintillation counter is positioned within the flow cell at a downstream location relative to the interrogation point.

5. The particle analyzer according to claim 2, wherein the scintillation counter is positioned within the flow cell at an upstream location relative to the interrogation point.

6. The particle analyzer according to claim 1, further comprising a particle injection conduit for injecting particles into the flow cell at a proximal end.

7. The particle analyzer according to claim 6, wherein the particle injection conduit is comprised of elongated tubing.

8. The particle analyzer according to claim 7, wherein the elongated tubing is coiled.

9. The particle analyzer according to claim 6, wherein the scintillation counter is operably connected to the particle injection conduit.

10. The particle analyzer according to claim 1, further comprising a particle ejection conduit for ejecting particles from the flow cell at a distal end.

11. The particle analyzer according to claim 10, wherein the particle ejection conduit is comprised of elongated tubing.

12. The particle analyzer according to claim 11, wherein the elongated tubing is coiled.

13. The particle analyzer according to claim 10, wherein the scintillation counter is operably connected to the particle ejection conduit.

14. The particle analyzer according to claim 1, wherein the scintillation counter comprises:
    a scintillator; and
    a scintillated light detector operably attached to the scintillator.

15. The particle analyzer according to claim 14, wherein the scintillation counter further comprises a photocathode positioned between the scintillator and the scintillated light detector.

16. The particle analyzer according to claim 14, wherein the scintillator comprises a crystal.

17. The particle analyzer according to claim 14, wherein the scintillator is optically opaque.

18. The particle analyzer according to claim 17, wherein the scintillator comprises an opaque coating.

19. The particle analyzer according to claim 1, further comprising a processor operably coupled to the particle-modulated light detector and the scintillation counter, wherein the processor is configured to receive particle-modulated light intensity data and particle radioactivity data from the particle-modulated light detector and the scintillation counter, respectively, and associate the received particle-modulated light intensity data and particle radioactivity data with a given particle.

20. The particle analyzer according to claim 1, wherein the particle-modulated light detector comprises a fluorescent light detector.

* * * * *